United States Patent
Lang

(10) Patent No.: US 7,998,566 B2
(45) Date of Patent: Aug. 16, 2011

(54) ARTIFICIAL SNOW AND ARTIFICIAL SKI AREAS

(76) Inventor: Jingming Lang, Beijing (CN)

( * ) Notice: Subject to any disclaimer, the term of this patent is extended or adjusted under 35 U.S.C. 154(b) by 1696 days.

(21) Appl. No.: 11/257,598

(22) Filed: Oct. 24, 2005

(65) Prior Publication Data

US 2007/0001021 A1 Jan. 4, 2007

(30) Foreign Application Priority Data

Jun. 30, 2005 (WO) ................ PCT/CN2005/000948

(51) Int. Cl.
*D04H 1/00* (2006.01)
*F25C 3/04* (2006.01)

(52) U.S. Cl. ...................................... 428/292.1; 239/2.2

(58) Field of Classification Search .......................... None
See application file for complete search history.

(56) References Cited

U.S. PATENT DOCUMENTS

| 3,020,811 | A | * | 2/1962 | Lincoln et al. | 404/28 |
| 3,291,486 | A | * | 12/1966 | Applegath et al. | 472/90 |
| 4,032,139 | A | * | 6/1977 | Gaudard | 472/90 |
| 4,087,088 | A | * | 5/1978 | Kelso | 472/91 |
| 2006/0282052 | A1 | * | 12/2006 | Saito et al. | 604/372 |

FOREIGN PATENT DOCUMENTS

JP 04-124302 * 4/1992

* cited by examiner

*Primary Examiner* — D. Lawrence Tarazano
*Assistant Examiner* — Camie Thompson
(74) *Attorney, Agent, or Firm* — Alston & Bird LLP

(57) ABSTRACT

The present invention is an artificial snow and an artificial ski area. The artificial snow is composed of a solid lubricant compound and resin grains, wherein the components of said solid lubricant compound include: 40-50 parts by weight paraffin and 15-25 parts by weight polyethylene ester or polypropylene ester or polyurethane grains and 15-30 parts by weight talcum powder. The artificial ski area includes an artificial snow layer formed from artificial snow and a fiber layer. The artificial snow layer is laid on top of the fiber layer. The above-described artificial snow and artificial ski area is not subject to temperature and seasonal restrictions. It does not require water or cooling agents. It is inexpensive to manufacture and is low cost. It can be designed and built according to actual needs to meet the needs of different groups of people.

17 Claims, 2 Drawing Sheets

ARTIFICIAL SNOW AND ARTIFICIAL SKI AREAS

FIELD OF THE INVENTION

Figure 1:
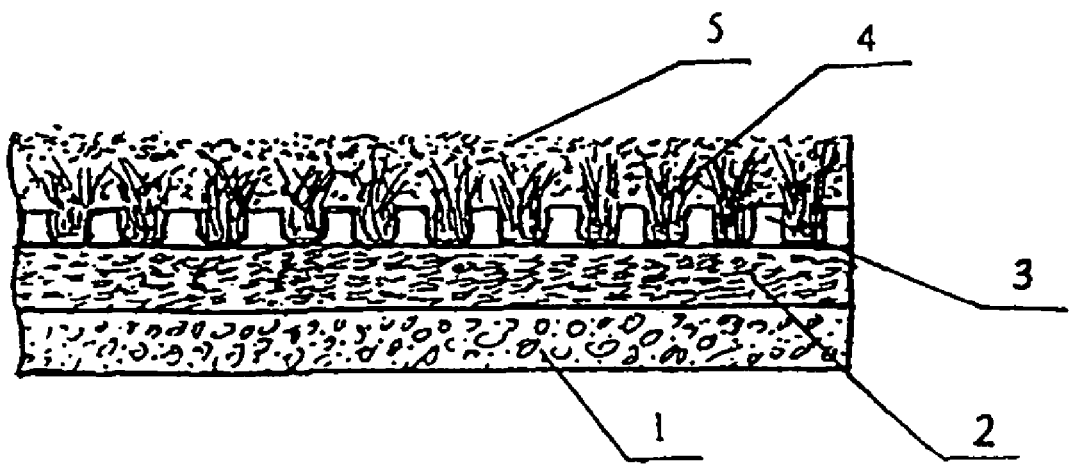

The present invention relates to a type of artificial snow and artificial ski area, particularly to a type of environmentally-friendly, reusable artificial snow that is not limited by temperature and season and to artificial ski areas that are not limited to certain places.

BACKGROUND OF THE INVENTION

The upsurge in winter sports in recent years has given rise to the rapid development of natural ski areas, which have been appearing throughout the world. However, because of the large areas of land they occupy and because of seasonal, weather, and cost factors, natural ski areas are generally built far from cities. Furthermore, natural ski areas are available for use only under certain conditions, namely during cold winters with below-freezing temperatures, snowy weather, and snow packs of a certain depth. These multiple requirements restrict the spread and development of these sports. Therefore, many countries have begun to research and develop artificial snow and artificial ski areas and have achieved a degree success. For example, artificial snow made with snow-making technologies from water-based materials can replace natural snow or improve its performance and quality. The drawback is that it is costly and requires a huge amount of water and electricity. Also, like natural snow, it is subject to air temperature and seasonal weather conditions. In addition, even in the winter, it is not unusual for artificial snow, after it has formed, to melt as soon as it hits the ground. This is not only a tremendous waste of resources; it is also the cause of the high cost of operations at ski areas now. To a certain extent, it also has a negative impact on the popularization of skiing sports. Another technology is plastic skiing grass and artificial ski areas that are composed of this kind of skiing grass. Skis slide over it as though over snow, but it has more resistance. Moreover, the physical and chemical properties of skiing grass and ski areas composed of skiing grass are far inferior to those of natural snow and natural ski areas. They rarely provide the full sensation and results of actual skiing. In addition, there are artificial snow and artificial ski areas made with silica gel. However, this kind of artificial snow swells instantly upon contact with water. It basically cannot be put to commercial use.

The above-described artificial ski areas, whether ski areas consisting of artificially-cooled snow, or skiing-grass ski areas or ski areas based on silica gel artificial snow, are subject to some of the same limitations that natural ski areas are subject to: they occupy large areas, are costly, are obviously dependent on seasons and the weather, and require certain environmental conditions. Therefore, to a certain extent, there is still no truly significant artificial snow or artificial ski area that is resistant to the weather, is inexpensive, is not limited to certain temperatures, and is applicable both indoors and out.

SUMMARY OF THE INVENTION

The object of the present invention lies in providing a type of artificial snow and artificial ski area that are not limited by the temperature and seasons, that do not require water or cooling agents, that are low-cost and inexpensive to produce, and that can be used both indoors and out. The physical and chemical properties of this artificial snow and the ski areas composed thereof are nearly as good as those of natural snow and natural ski areas. In addition, such artificial ski areas can be designed and constructed in accordance with actual needs and thus meet the needs of different groups of people.

The present invention provides a type of artificial snow, composed of a solid lubricant compound and resin grains, wherein the components of said solid lubricant compound include: 40-50 parts by weight paraffin and 15-25 parts by weight polyethylene ester or polypropylene ester or polyurethane grains.

In the composition of the artificial snow of the present invention, the solid lubricant compound will, at a certain temperature, become sticky and will turn lumpy and hard. The resin grains, however, have very good fluidity. The combination of the two causes the lubricant to be dispersed effectively. The interactions between the two can increase the laxity of the "snow grains" in any temperature environment. Therefore, there are no strict limits on the proportions of the two materials combined in this artificial snow. All that is necessary is that the solid lubricant achieves a certain amount of connectivity between the resin grains. The specific proportions between the two may be determined according to the dispersivity of the "snow" that is to be formed or the relative friction required for a site when it is being used for a ski area. Typically, the amount of solid lubricant used can be from 5% to 95% of the snow by weight.

The components of the solid lubricant compound may further comprise 10-20 parts by weight monoanhydride ester stearate, 15-25 parts by weight polyethylene oxide, 5-15 parts by weight calcium stearate, and 15-30 parts by weight talcum powder.

Said resin grains are polyvinyl chloride grains or are called plastic grains.

The artificial snow with the above-described composition does not require water or any cooling agent. It is not subject to temperature and seasonal limitations. Moreover it has the external visual characteristics and feel of natural snow. It can replace natural snow or artificially cooled snow that is deposited as a layer of snow at ski areas. If the artificial snow of the present invention is used to build a ski area, not only will it be easy to control the size of the ski area, but also, by adjusting the relative proportions of the components, it will be possible to control the adhesiveness of the snow and the friction between the snow and snow equipment and thus provide the appropriate sliding properties.

When the above-described artificial snow is used to cover a ski area, one can directly lay a layer of snow by using materials whose components have all been previously mixed. The grain diameters of the materials should be from 0.1 to 2 mm. It is also possible, when laying down a snow layer, to form a base layer after mixing all the components of the solid lubricant and then to use resin grains as a surface layer that is laid on the base layer. In this case, the diameters of the grains that serve as the surface layer should be 0.1 to 2 mm. In theory, the deeper the base layer is, the better. It should be at least 2 mm. However, given cost and other factors, approximately 1 cm is generally acceptable.

The present invention also provides a practical artificial ski area that has a novel structure. It is constructed of at least an artificial snow layer and a fiber layer. That is, a fiber layer is laid under the artificial snow layer. The composition of the artificial snow layer and the way in which it is formed was explained above. The solid lubricant components used in making this artificial snow layer can also be simply lubricant materials such as paraffin, polyethylene ester grains, polypropylene ester grains, polyurethane grains, talcum powder, or a mixture of these lubricants with resin grains. The role of said fiber layer is to maintain stability of the snow and to hold the snow during the skiing process and to keep large volumes of the snow layer from flowing away during skiing and to prevent obvious lack of uniformity in thickness of the snow layer as a result of skiing actions and forces. This artificial snow can either directly blanket the fiber layer or be interwoven with and cover it. The friction of snow equipment sliding on the surface of the snow layer can be regulated by adjusting the amount of resin grains used. For example, if the amount of plastic grains is increased and the resulting mixture of materials is used to lay down a snow layer, the plastic grains will cause the solid lubricants to be dispersed fully. The surface layer of the snow layer will have more plastic grains. Or, if separate layers are laid, the high-plastic grain density layer will be laid to a certain depth. When snow equipment slides on the surface of the snow, the rolling movements of the plastic grains cause them to slide quickly, and friction between the snow equipment and the snow surface decreases.

The materials of the fiber layer can be polyethylene, polypropylene, nylon, or a mixture of at least two of the above. Artificial turf site materials can be put to direct use. Preference is given to fibers with greater rigidity. Fibers dispersed and distributed according to various specifications (e.g., distributed perpendicular or at a certain angle to the ground) particularly improve its snow-holding stability.

The structure of artificial ski area of the present invention can be determined according to the characteristics and demands of the people who use it. For example, the above-described fiber layer and snow layer can be laid at the site to allow beginners to fully experience the sensation and fun of skiing.

In the structure of an artificial ski area of the present invention, an elastic layer can be laid beneath the fiber layer, and a foundation layer can be laid beneath the elastic layer. The materials used for the elastic layer are polyurethane (for example elastic polyurethane), rubber (for example natural rubber or artificial synthetic rubber), foam PVC (polyvinyl chloride) or foam plastic. Its role is to increase elasticity and to reduce slippage caused by flat surface hardness when a skier performs a giant slalom or jump. It thus guarantees high-quality action and personal safety for the skier. Therefore, depending on the purposes and needs of the site, the elastic layer can be made from even softer materials, e.g. layers filled with air or water, even suspended steel nets or steel cords. The materials used for the foundation layer can be cement, plastic, asphalt, concrete, wood, metal, or any combination of the above. A sand or soil layer can also be used directly.

In order to achieve even more realistic skiing effects, and depending on differences in the environment of the location and of the target group, the artificial ski area structure of the present invention should comprise a framework, an elastic layer, and a foundation layer, in that sequence, under the fiber layer. The layers can be connected to each other by direct laying, adhesive bonding, tying, hot welding, or stapling. Each gap between fibers of the fiber layer on which the artificial snow is laid or dispersed is also filled with artificial snow.

Each layer in the structure of the above-described ski area of the present invention performs the role that is described below: The foundation layer can cause each of the above layers to have a more solid stable foundation. The elastic layer can provide the ski area with a certain elastic and buffering effect so that, when someone is skiing, he feels no hardness or, if he falls down, he suffers no injury. The framework layer performs the roles of supporting, maintaining, and stabilizing the fiber layer and the artificial snow (layer). The fibers of the fiber layer connect perpendicularly in the column gaps of the framework layer. Both it and the framework layer perform the role of supporting artificial snow grains (maintaining snow stability). They form a stable snow-holding layer and prevent artificial snow from leaking into the layer below and prevent lack of uniformity of snow layer depth that occur when artificial snow grains are thrown aside as a skier executes a sliding turn or brakes and stops. They also can prevent artificial snow from flowing away because of poor adhesion. The artificial snow layer is composed of lubricants and plastic grains of a certain size. Its surface is slippery to a certain extent. Dispersed on the fiber layer, it forms the top layer of the artificial ski area, with the result that when skiers slide over it, they experience the same sensation they would experience at a natural ski area.

The said framework serves as a support structure. It can be made from hot melt polyurethane (for example, high-strength hot melt polyurethane), polyethylene, polypropylene, nylon plastic, engineering plastic (ABS plastic), or any combination of the above. Generally, it can be a columnar structure to enable the fiber layer to connect perpendicularly within the framework (within the gaps between the column-shaped objects). Column height is preferably from 2 to 200 mm and ideally from 30 to 50 mm. Column cross-section dimensions are 1 to 12 mm (for example the diameter of a round column). Gaps between columns are 1 to 50 mm.

The disposition and structure of the framework, including the framework's column structure design and the manner in which the framework is assembled, has an important effect on achieving the goals of allowing skiers to experience a more realistic world and of providing advanced skiers with the ski area conditions that enable them to perform difficult skiing events. For example, when skiers are provided with U-shaped chutes, high-platform ski jumping, and cross-country ski areas, they basically do not perform any stops while skiing. Therefore, it is critical that the design of the surface layer and of the framework guarantee a good level of slipperiness. In these situations, the top surface of the framework should be as large as possible and should form a level plane. That is, one should use framework columns (round or square columns) with large cross-sections and smaller inter-column gaps. The frameworks of snow-boarding areas ought to be designed to have conical columns with thicker lower halves. The reason for this is that snow boarding requires gentle stopping action, while turning and sliding usually make use of the edge of the snow board. Ski areas with high-platform jumping need to ensure skier safety, so the framework should not be as high, and the fiber layer should be thicker.

In addition to the methods already mentioned, frameworks can be connected together using methods similar to those that are now commonly employed to assemble wood floors for interior decoration. Such methods include lock-tab, inset-tab, and lock-tab/inset-tab. Plastic welding can also be used, as can magnetic attachment (the connecting parts are attached using magnetic materials) and so on. Frameworks can also be connected by zipping, sewing, stapling, tying, and other feasible methods.

In a preferred embodiment of the present invention, the layer structure of said artificial ski area is as follows, from the bottom layer up: the foundation layer, the elastic layer, the framework, the fiber layer, and the artificial snow layer. With the exception of the artificial snow layer, all layers are attached to each other by cementation. The framework is connected using the lock-tab/inset-tab method. The artificial snow layer is dispersed on the fiber layer, and it is divided into a base layer and a surface layer. The base layer is the lubricant layer and is approximately 3 to 5 mm and compacted. The surface layer is simply laid on top of the base layer.

All of the materials used by the present invention are non-toxic, non-hazardous, flame-resistant materials and meet safety and health requirements. All of the materials are common chemical materials which can be purchased on the market or easily made, and the artificial snow can be re-used, which means even more thorough compliance with environmental requirements.

The sliding performance of present invention artificial ski areas approximates that of natural ski areas, but is not subject to the effects of seasons, weather, and ambient temperature. It can be installed both indoors and outdoors for year-round use. It simplifies both ski area construction and snow surface upkeep, and it greatly reduces the cost of management and construction. It also facilitates the spread and development of ski sports. The flexibility of its construction methods means that ski areas can be installed as three-dimensional spirals or intersecting structures which increase the difficulty of skiing and add to its technical challenge and interest.

The positive benefits of an artificial ski area of the present invention embodying the above-described technical schemes are: Being constructed from multiple layers of materials, its physical and chemical properties, especially its sliding properties, can approximate those of natural ski areas. It remains unaffected by air temperatures throughout the four seasons. It can be installed easily at any time and in any location, including indoor sites and even in high-rise structures. It is not strictly constrained by layout limitations of an existing ski area. It can be designed to have ski routes of various shapes, as needed. For example, it can have ring, three-dimensional spiral, winding, and various forms of curve designs. The occupied surface area can be adjusted at will to suit the environment and conditions. It can serve as a facility that is part of an urban amusement park. Available to people for year-round use, it will boost interest, safety, and athletic competition. Artificial snow means that sliding properties are under human control, and the interactions of special components of artificial snow can reduce loss during ski runs, thus reducing upkeep costs of the ski area and extending the reach of ski sports in terms of both location and time. All the materials used in this artificial snow and these artificial ski areas are non-toxic, non-hazardous, flame-resistant materials that do not require a precious natural resource—water. Artificial snow can also be re-used and complies with environmental, safety and health requirements. It is inexpensive to manufacture. Therefore, the present invention ought to be disseminated and applied. It has extremely high commercial value.

DESCRIPTION OF ATTACHED DRAWINGS

FIG. 1: Structural schematic diagram of embodiments 1 and 2 of an artificial ski area of the present invention.

Figure 2:
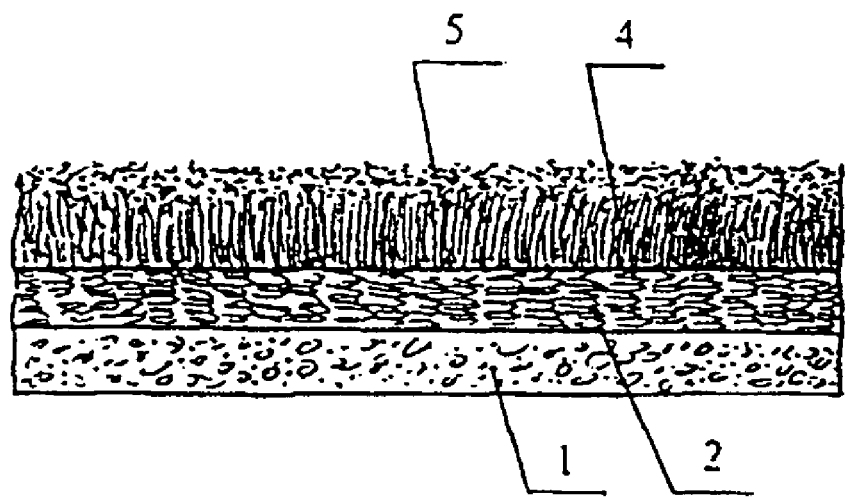

FIG. 2: Structural schematic diagram of embodiment 3 of an artificial ski area of the present invention.

Figures 1, 3:
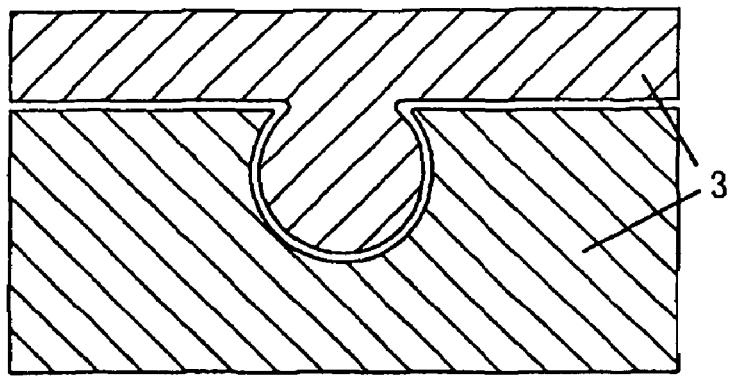
Figures 2, 3:
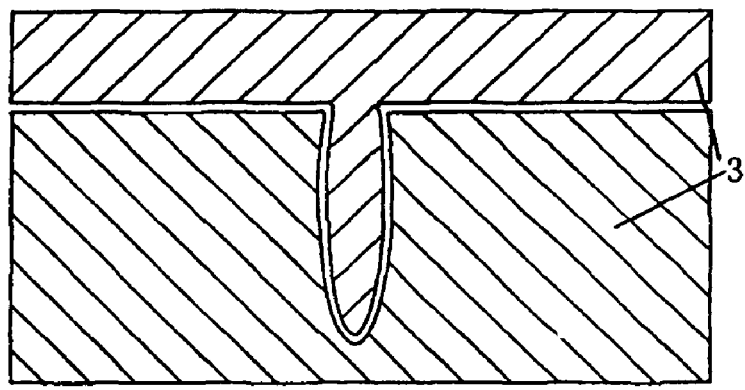
Figure 3:
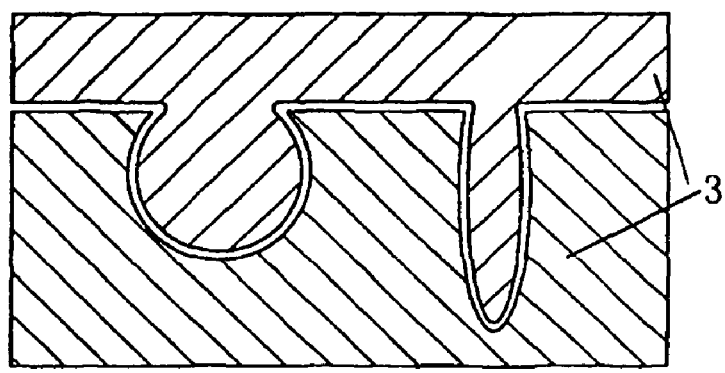

FIGS. 3-1, 3-2, and 3-3 are schematic diagrams of framework connection methods. They are lock-tab, inset-tab, and lock-tab/inset-tab, respectively.

DRAWING LABELS

1—Foundation layer; 2—Elastic layer; 3—Framework; 4—Fiber layer; and 5—Artificial snow layer

DETAILED DESCRIPTION OF THE PREFERRED EMBODIMENTS

The following are detailed explanations of the present invention in light of specific embodiments, but these do not serve to restrict the present invention.

Embodiment 1

Composition of Artificial Snow:

Solid lubricant compound (parts by weight): paraffin 50, AC-617 (polyethylene ester) 20, talcum powder 25, monoanhydride ester stearate 15, polyethylene oxide 20, and calcium stearate 10.

After the above components are mixed, they are mixed with polyvinyl chloride grains to make artificial snow, wherein said solid lubricant content is 40% to 60% by weight and "snow grains" are formed with grain diameters of approximately 1 mm.

Embodiment 2

Composition of Artificial Snow:

Solid lubricant compound (parts by weight): paraffin 45, AC-617 (polyethylene ester) 20, talcum powder 30, monoanhydride ester stearate 18, polyethylene oxide 25, and calcium stearate 10.

After all components have been thoroughly mixed, compress to form a base layer of approximately 1 cm. Lay polyvinyl chloride grains having diameters of approximately 0.8 to 1.2 mm as a surface layer on said base layer. The amount of polyvinyl chloride grains should be approximately 50% to 80% of the base layer material. The artificial snow layer is thus formed.

Embodiment 3

On a flat surface of a concrete foundation layer 1, use a bonding agent to bond elastic sponge polyurethane to the flat cement surface to form the elastic layer 2. After it has dried, take base boards on which have been formed hot melt polyurethane column shapes 20 mm high, 4 mm in diameter and 5 mm apart and bond them to the elastic layer 2 to form the framework 3. Vertically insert the fiber layer 4, which is made by mixing polyethylene and polypropylene plastic in a 1:1 ratio, into the inter-column gaps of the framework 3. The bottom of the fiber layer is tied to the base boards of the perforated framework. Disperse 1 mm-diameter artificial snow grains, made by adding paraffin to polyethylene, on the fiber layer 4 that is supported by the framework 3. The above forms the ground layer at a ski area. It can be used by people as a ski area.

Or, disperse the artificial snow of embodiment 1 on the fiber layer 4 to form a 3 to 5 mm snow layer.

The framework in this ski area design is not very high. By affecting an appropriate increase in the height of the fiber layer, one can provide for high-platform jump events.

Embodiment 4

With polyvinyl chloride boards as the foundation layer 1, securely staple foam PVC to the foundation layer 1 to form the elastic layer 2. Then bond frameworks that are shaped to have polyurethane columns to the elastic layer 2 to form the frameworks (framework layer) 3. Its columns are 50 mm high, 8 mm in diameter, and 10 mm apart. The tops of the framework columns are, as much as possible flat, and the frameworks are connected securely as shown in FIG. 3-3. Then vertically insert the fiber layer 4, which is made from polyethylene, into the inter-column gaps of the framework 3. The bottom of the fibers is tied to the perforated framework 3. Lastly, spread artificial snow (one can also use the artificial snow of embodiment 2) made from a mixture of 2 mm-diameter polyurethane grains and sodium stearate on the fiber layer 4 to form a surface layer for people to use as a ski area.

This ski area can be used for U-shaped chute or high-platform jump chute or cross-country skiing events.

Embodiment 5

On a flat surface of a cement foundation layer 1, use a bonding agent to bond elastic sponge polyurethane to the flat cement layer 1 to form the elastic layer 2. After it has dried, perpendicularly secure the fiber layer 4, which was made by mixing polyethylene and polypropylene according to a 1:1 ratio, to the elastic layer 2 using the hot melt method. The fiber density should approximate that of a lawn; then, artificial snow grains of embodiment 1 to a depth of 0.5 to 1 cm on the fiber layer 4.

This ski area structure does not make use of frameworks. It is easy to engineer and can be used by beginners.

Embodiment 6

The top to bottom structure of an artificial ski area with a suspension design is as follows: the artificial snow layer 5 of embodiment 1, the fiber layer 4, the frameworks 3, and the suspended elastic layer 3 having a structure of steel nets or steel cords (these steel cords can also be suspended at both ends from columns erected on both sides or on a frame structure). The frameworks are connected to each other by a combination of lock-tab and inset-tab, the objective being to strengthen framework support.

Because this ski area structure is suspended and uses a high-strength elastic steel net or steel cord structure as its elastic layer, it is better suited to such actions as giant slaloms, super giant slaloms, and jumps. It eliminates the tendency towards slipping on flat hard bases and increases safety and comfort.

In the above embodiments, foundation layers 1 that make use of materials such as cement or asphalt concrete should be completed on site. If they make use of other materials, then they can be made and assembled in a shop and later installed on site.

That which is claimed:

1. An artificial ski area, comprising an artificial snow layer formed from artificial snow, a framework, and a fiber layer, wherein said artificial snow layer is laid on top of said fiber layer, wherein the framework is disposed below the fiber layer and comprises columnar structures connected to each other, and wherein the fiber layer is perpendicularly connectable in the gaps of the columnar structures.

2. The artificial ski area as claimed in claim 1, wherein said artificial snow layer is formed from artificial snow, said artificial snow comprising a solid lubricant compound and resin grains, said solid lubricant compound comprising: 40-50 parts by weight paraffin and 15-25 parts by weight polyethylene ester, polypropylene ester or polyurethane grains.

3. The artificial ski area as claimed in claim 2, wherein said solid lubricant compound further comprises 10-20 parts by weight monoanhydride ester stearate, 15-25 parts by weight polyethylene oxide, 5-15 parts by weight calcium stearate, and 15-30 parts by weight talcum powder.

4. The artificial ski area as claimed in claim 2, wherein said resin grains include polyvinyl chloride grains.

5. The artificial ski area as claimed in claim 2, wherein said solid lubricant and resin grains are combined as separate layers, the solid lubricant being the base layer and the resin grains being the surface layer that covers said base layer.

6. The artificial ski area as claimed in claim 1, wherein the fiber layer comprises polyethylene fibers, polypropylene fibers, nylon fibers, or a mixture thereof.

7. The artificial ski area as claimed in claim 1, further comprising an elastic layer below the fiber layer and the framework, and a foundation layer below the elastic layer.

8. The artificial ski area as claimed in claim 7, wherein said elastic layer is a polyurethane layer, a rubber layer, a foam PVC layer, or a foam plastic layer.

9. The artificial ski area as claimed in claim 7, wherein said elastic layer is an air-filled layer, a water-filled layer, a soft sponge layer or a combination thereof, optionally further combined with one or more of a polyurethane layer, a rubber layer, a foam PVC layer, and a foam plastic layer.

10. The artificial ski area as claimed in claim 7, wherein said foundation layer comprises cement, plastic, asphalt, concrete, wood, metal, or a combination thereof.

11. The artificial ski area as claimed in claim 7, wherein said elastic layer comprises suspended steel net or steel cords.

12. The artificial ski area as claimed in claim 1, wherein the grain diameters of the artificial snow layer are 0.1-2 mm.

13. The artificial ski area as claimed in claim 1, wherein said artificial snow layer comprises a base layer formed from solid lubricant and a surface layer of resin grains covering the base layer, the base layer depth being at least 2 mm.

14. The artificial ski area as claimed in claim 13, wherein the grain diameters of said artificial snow layer are 0.1-2 mm.

15. The artificial ski area as claimed in claim 1, wherein said framework comprises elastic polyurethane, polyethylene, polypropylene, nylon plastic, engineered plastic, or a combination thereof.

16. The artificial ski area as claimed in claim 1, wherein said columnar structures being 2-200 mm high, 1-12 mm in diameter, and having 1-50 mm gaps between columns.

17. The artificial ski area as claimed in claim 1, wherein the methods of connecting said columnar structures include one or more of lock-tab connection, inset-tab connection, lock-tab/inset-tab connection, welding, magnetic connection, zipping, sewing, stapling, and tying.

* * * * *